United States Patent
Gupta (10) Patent No.: US 7,903,589 B2
(45) Date of Patent: Mar. 8, 2011

(54) SYSTEM AND METHOD FOR PROVIDING CALLER IDENTIFICATION FOR A TDM CONFERENCE CALL

(75) Inventor: Shekhar Gupta, Overland Park, KS (US)

(73) Assignee: Embarq Holdings Company LLC, Overland Park, KS (US)

( * ) Notice: Subject to any disclaimer, the term of this patent is extended or adjusted under 35 U.S.C. 154(b) by 164 days.

(21) Appl. No.: 12/393,112

(22) Filed: Feb. 26, 2009

(65) Prior Publication Data
US 2010/0215162 A1 Aug. 26, 2010

(51) Int. Cl.
*H04L 12/18* (2006.01)
(52) U.S. Cl. ............ 370/261; 370/401; 379/142.04; 379/158
(58) Field of Classification Search .......... 370/252, 370/389, 392, 400, 401, 260–263; 379/142.04, 379/142.08, 158
See application file for complete search history.

(56) References Cited

U.S. PATENT DOCUMENTS

| 4,049,921 | A | | 9/1977 | Zwack | |
|---|---|---|---|---|---|
| 5,867,559 | A | * | 2/1999 | Jorgensen et al. | 379/67.1 |
| 7,062,025 | B2 | * | 6/2006 | Summers et al. | 379/202.01 |
| 7,466,812 | B1 | * | 12/2008 | Mahy et al. | 370/260 |
| 2006/0159099 | A1 | * | 7/2006 | Hensley | 370/395.1 |
| 2007/0288562 | A1 | | 12/2007 | Shaffer et al. | |
| 2010/0020728 | A1 | * | 1/2010 | Jefferson et al. | 370/260 |

\* cited by examiner

*Primary Examiner* — Pankaj Kumar
*Assistant Examiner* — Duc T Duong
(74) *Attorney, Agent, or Firm* — Matthew P. Harlow (57) ABSTRACT

Embodiments of the disclosed invention include a method performed by a conference server for providing caller identification information for a TDM conference call. In one embodiment, the method includes receiving a request from a host to set up a TDM conference call. The method further includes receiving host configuration parameters for providing the host with caller ID information of callers participating in the conference call. The method provides the host with a calling number for enabling callers participating in the conference call to call in. In response to receiving a call and caller ID information associated with a caller calling the calling number, the method connects the call to the conference call and provides the caller ID information to the host based on the host configuration parameters.

18 Claims, 5 Drawing Sheets

SYSTEM AND METHOD FOR PROVIDING CALLER IDENTIFICATION FOR A TDM CONFERENCE CALL

BACKGROUND OF THE INVENTION

Time-division multiplexing (TDM) is a method for transferring multiple data streams in a single signal by separating the signal into many segments. The circuit that combines the signals at the transmitting end of a communications link is known as a multiplexer. The multiplexer accepts the input from each individual end user, breaks each signal into segments, and assigns the segments to the composite signal in a rotating sequence. At a receiving end, the individual signals are separated out by a demultiplexer and routed to the proper end users.

TDM technology is often used in conference calls. A conference call is a telephone call connecting multiple telephone lines for enabling simultaneous communication between multiple parties. In most cases, the participants of a conference call calls into a conference call by dialing into a special telephone number that connects to a conference server (a specialized type of equipment that links telephone lines). Most companies use a specialized service provider who maintains the conference server, or who provides the phone numbers and PIN codes that participants dial to access the meeting or conference call.

However, currently, TDM conference call technology does not provide the host with caller identification of participant callers of a conference call. In most situations, a participant calling into the conference call verbally announces their identity when joining the conference call. Thus, the disclosed embodiments recognize that a major security hole exists because anyone that knows a conference call number and/or pin code may call and listen in to a conference call without informing the host of their presence.

SUMMARY

Embodiments of the disclosed invention include a system and method for providing caller identification for a conference call that utilizes a time division multiplex (TDM) telecommunication switching system, hereinafter referred to as a TDM conference call. For example, in accordance with one embodiment, a method performed by a conference server for providing caller identification information for a TDM conference call is disclosed. In one embodiment, the method includes receiving a request from a host to set up a TDM conference call. The method further includes receiving host configuration parameters for providing the host with caller ID information of callers participating in the conference call. The method provides the host with a calling number for enabling callers participating in the conference call to call in. In response to receiving a call and caller ID information associated with a participant calling the calling number, the method connects the call to the conference call and provides the caller ID information to the host based on the host-provided configuration parameters.

In accordance with another embodiment, a conference server for providing caller identification information for a TDM conference call is disclosed. In one embodiment, the conference server includes a memory component for storing computer executable instructions, a processing unit for executing the computer executable instructions, a conference call module for setting up the TDM conference call and for receiving host configuration parameters for providing the host with caller ID information of callers participating in the TDM conference call, a communication interface for receiving a caller ID associated with an incoming call to the TDM conference call, a conference bridge for connecting the incoming call to the TDM conference call, and a caller ID module for providing the caller ID associated with the incoming call to the host based on the host-provided configuration parameters.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
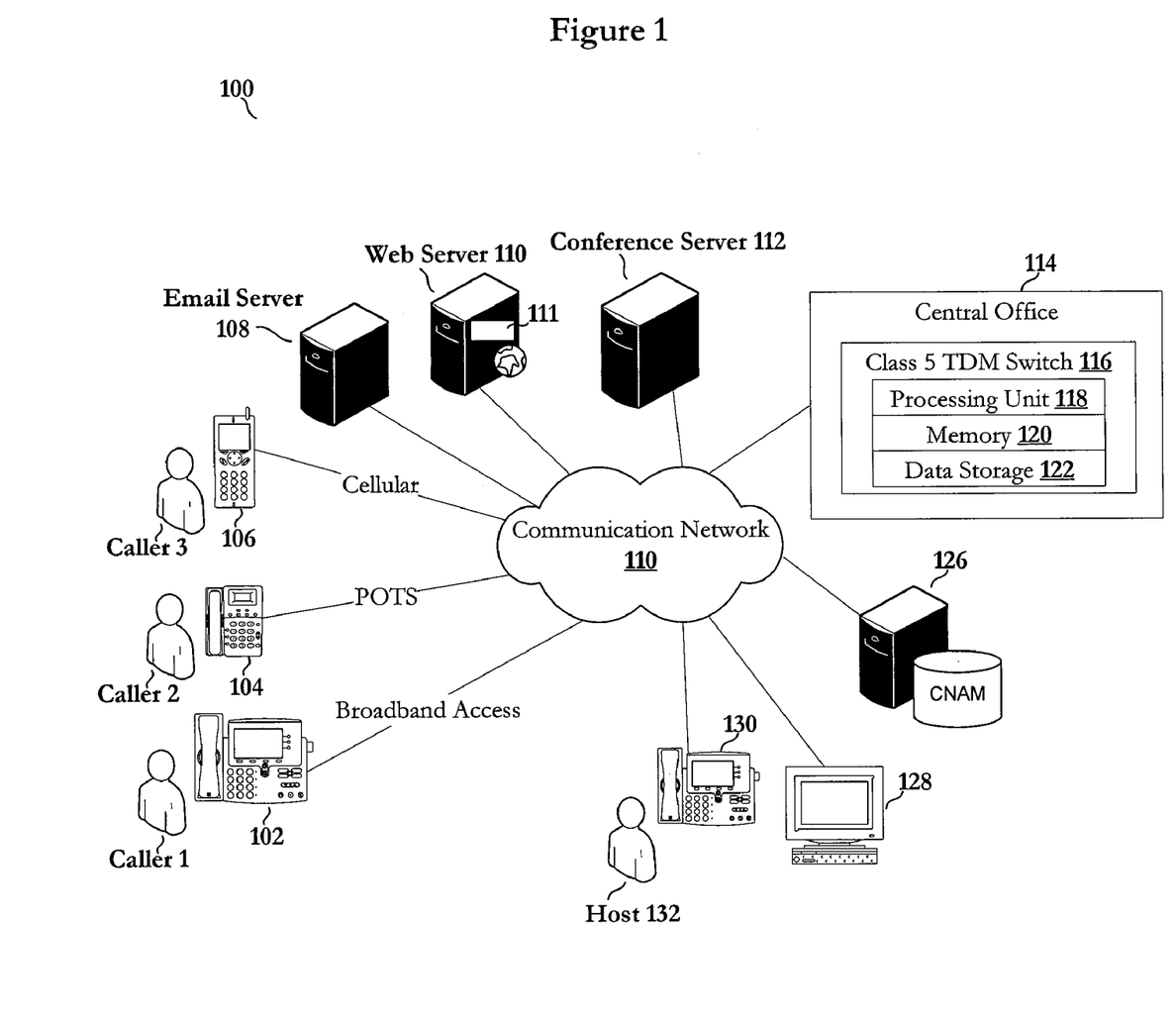
FIG. 1 depicts an embodiment a network environment in which the illustrative embodiments may be implemented.

FIG. 1 depicts an embodiment a network environment 100 in which the illustrative embodiments may be implemented. In the depicted embodiment, a plurality of devices, such as, but not limited to, one or more communication devices and data processing systems, may communicate over communication network 110. In some embodiments, communication network 110 may include a public switched telephone network (PSTN), a mobile network, and/or a data network, such as, but not limited to, the Internet, for routing communications between the one or more communication devices and data processing systems. The Internet is a global system of interconnected computer networks that interchange data using the standardized Internet Protocol Suite (TCP/IP). In addition, in some embodiments, communication network 110 may include other types of data networks, such as, but not limited to, an intranet, a private local area network (LAN), a wide area network (WAN), and a wireless local area network (WLAN).

In accordance with the disclosed embodiments, a host 132 utilizing a communication device 130 and/or a data processing system 128 may communicate with a conference server 112 via communication network 110 for setting up and configuring a TDM conference call between host 132, caller 1, caller 2, and caller 3. In some embodiments, communication device 130 may be in IP phone, an analog phone, or a cellular phone. Data processing system 128 may be, but is not limited to, a personal computer, a smart phone, and/or a personal digital assistant (PDA). In addition, caller 1, caller 2, and caller 3 may utilize any type of communication device capable of communicating with a communication network 110 for participating in a TDM conference call. For example, in one embodiment, caller 1 may utilize an IP phone 102 with broadband access for enabling voice over IP communication with conference server 112. Additionally, caller 2 may utilize a regular analog phone 104 and caller 3 may utilize a cellular phone for communicating with conference server 112.

As will be further described, in one embodiment, conference server 112 comprises a combination of hardware and software that allows 3 or more clients/callers to participate in a real-time voice conference. In some embodiments, conference server 112 may be a third party network device located within communication network 110. Alternatively, in some embodiments, conference server 112 may be located at a telephone company's central office, such as, but not limited to, central office 114. In one embodiment, central office 114 may be a building in a locality to which subscriber lines associated with conference server 112 are connected. In some embodiments, central office 114 may have switching equipment that can switch calls locally or to long-distance carrier phone offices, such as, but not limited to, a class 5 TDM telephone switch 116.

In accordance with the disclosed embodiments, class 5 TDM telephone switch 116 utilizes time division multiplexing technology for providing telephony service to conference server 112, such as, but not limited to, local switching, call routing, and other network services. In one embodiment, class 5 TDM telephone switch 116 may include a number of electrical components, such as, but not limited to, processing unit 118, memory 120, and data storage 122. In some embodiments, processing unit 118 may comprise a plurality of microprocessors and/or digital circuits for providing the services of class 5 TDM telephone switch 116. Memory 120 may be utilized to store executing computer instructions. In one embodiment, data storage 122 may store configuration data associated with providing telephony service to conference server 112. For example, in accordance with one embodiment, class 5 TDM telephone switch 116 may be configured to send, to conference server 112, the caller IDs associated with incoming calls to a TDM conference call hosted by conference server 112. Additionally, in some embodiments, class 5 TDM telephone switch 116 and/or conference server 112 may communicate with a calling names database (CNAM) 126 for retrieving a calling name/subscriber name associated with a caller ID calling into a TDM conference call. In other embodiments, host 132 may provide a list of expected caller IDs and calling names associated with a TDM conference call for enabling conference server 112 to retrieve calling names locally from the host-provided list.

In some embodiments, conference server 112 may communicate with a web server 110 for receiving configuration data associated with a TDM conference call. For example, in one embodiment, a host utilizing data processing system 128 may communicate with web server 110 for setting up and configuring a TDM conference call with conference server 112. For instance, in one embodiment, web server 110 may host a webpage 111 for enabling a host to reserve and configure a TDM conference call on conference server 112. In some embodiments, webpage 111 may include a user-selectable option for configuring conference server 112 to provide the caller IDs associated with incoming calls to a TDM conference call to a host. In addition, in some embodiments, webpage 111 may include a user-selectable option for configuring the means by which the caller IDs associated with incoming calls to the TDM conference are provided to the host. For example, in one embodiment, host 132 may configure conference server 112 to provide the caller IDs associated with incoming calls to a TDM conference call as an e-mail message to a host-provided email address. For example, in one embodiment, conference server 112 may communicate with an email server, such as, but not limited to, email server 108, for transmitting email messages. In another embodiment, host 132 may configure conference server 112 to provide the caller IDs associated with incoming calls to a TDM conference call as an SMS text message to a host-provided phone number.

Figure 2:
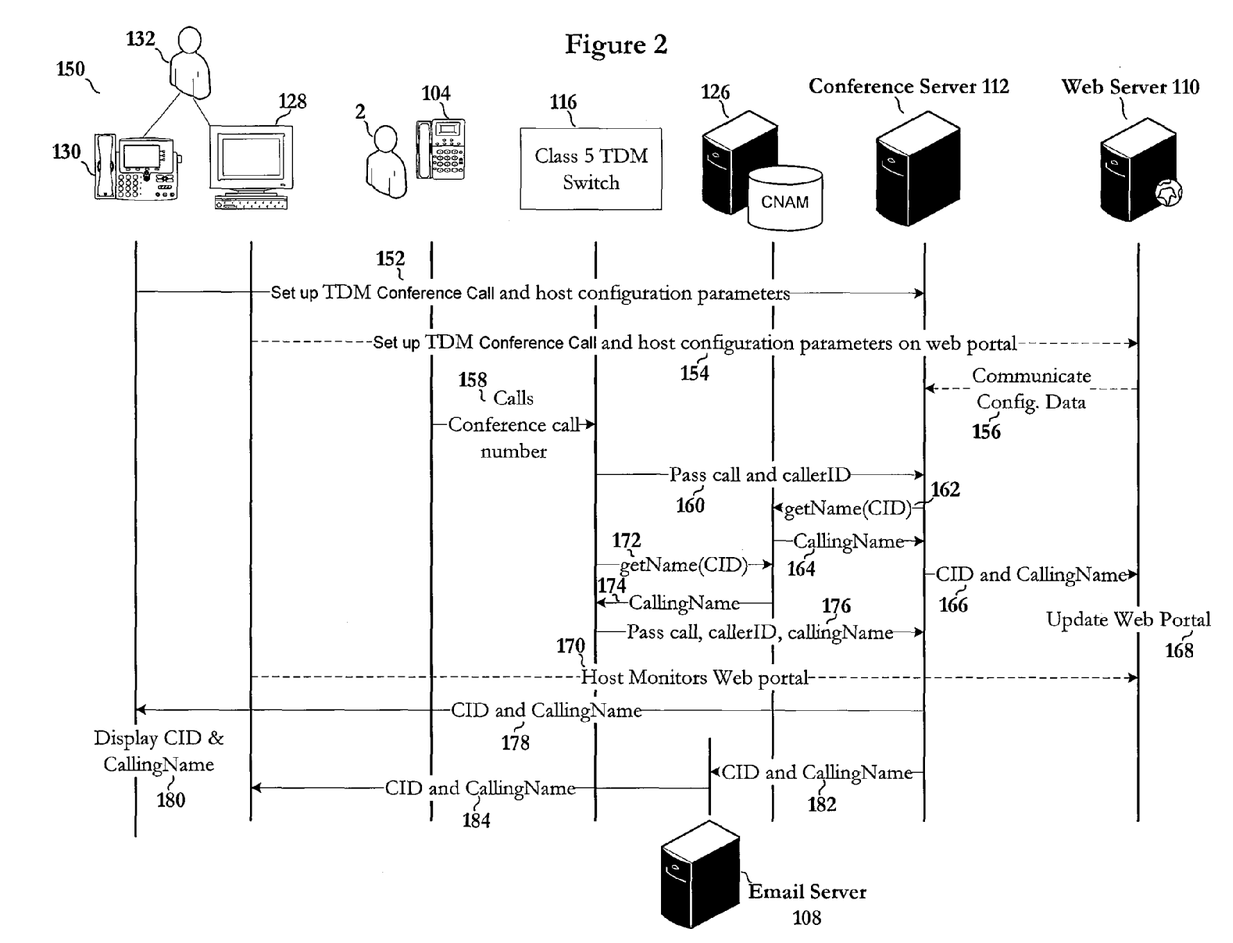
FIG. 2 depicts an embodiment of a sequence diagram for providing caller identification for a TDM conference call in accordance with the illustrative embodiments.

With reference now to FIG. 2, an embodiment of a sequence diagram 150 for providing caller identification for a TDM conference call is presented in accordance with the illustrative embodiments. Sequence diagram 150 depicts host 132 utilizing communication device 130 and/or data processing system 128 for configuring and monitoring caller ID information associated with participating callers of a TDM conference call. For example, in the depicted embodiment, caller 2 represents a caller participating in a TDM conference call arranged by host 132.

Sequence diagram 150 begins with host 132 communicating with conference server 112 for setting up a TDM conference call. For example, in one embodiment, host 132 may utilize communication device 130 to contact conference server 112 for setting up a TDM conference call and for providing host configuration parameters, such as, but not limited to, an expected time and date of the conference call (step 152). As referenced herein, host configuration parameters are settings provided by a host of a TDM conference call for setting up the TDM conference call and may include settings for specifying the means by which the host is provided with the caller IDs of participating callers of the TDM conference call. For instance, in one embodiment, conference server 112 may utilize an interactive voice response (IVR) system for receiving user input associated with setting up and configuring a TDM conference call. In another embodiment, host 132 may utilize data processing system 128 for setting up a TDM conference call and for providing host configuration parameters to conference server 112 via a webpage (step 154). For example, in one embodiment, web server 110 may host a webpage for enabling a host to request and configure a TDM conference call on conference server 112. In these embodiments, web server 110 may communicate the conference call configuration data to conference server 112 (step 156).

In accordance with one embodiment, when caller 2, utilizing communication device 104, calls a calling number associated with the arranged conference call (step 158), class 5 TDM telephone switch 116 receives the call and identifies the caller ID, e.g., a telephone number associated with communication device 104. As referenced herein, a calling number may include a pin and/or access number for calling into a TDM conference call. In one embodiment, class 5 TDM telephone switch 116 is configured to pass the call and the caller ID to conference server 112 (step 160). Additionally, in some embodiments, conference server 112 is configured to communicate with calling names database 126 for querying (step 162) and retrieving a calling name associated with the caller ID (step 164). In some embodiments, conference server 112 may pass the caller ID and calling name to web server 110 (step 166) for enabling web server 110 to update and display a list of caller IDs and calling names that are connected to a TDM conference call on a webpage (step 168). In these embodiments, host 132 may monitor the webpage, using data processing system 128, for identifying the participants of the TDM conference call (step 170).

Alternatively, in some embodiments, class 5 TDM telephone switch 116 may, instead of conference server 112, be configured to query (step 172) and retrieve a calling name associated with the caller ID (step 174). In these embodiments, class 5 TDM telephone switch 116 may pass the call, caller ID, and calling name to conference server 112 (step 176).

Additionally, in some embodiments, conference server 112 may be configured with a host-provided list of calling names associated with expected caller IDs corresponding to communication devices of participants of a TDM conference call. In one embodiment, conference server 112 may be configured to locally retrieve, if available, the calling names corresponding to a caller ID from the host-provided calling list. In addition, in some embodiments, conference server 112 may be configured to notify/alert host 132 of an unexpected caller ID in response to a caller ID associated with a caller not being on the host-provided list. In these embodiments, host 132 may take the appropriate measures for identifying the caller associated with unexpected caller ID, such as, but not limited to, ensuring the caller verbally identify himself.

In addition, in some embodiments, conference server 112 may be configured to provide the caller ID and calling name of the caller to a host communication device, such as, but not limited to, communication device 130 (step 178). For example, in one embodiment, communication device 130 may include caller ID capability for displaying the caller ID and calling name on a display component of communication device 130 (step 180). Alternatively, or in addition to, in some embodiments, conference server 112 may transmit the caller ID and calling name to an e-mail server (step 182), such as, but not limited to, e-mail server 108, for notifying host 132 by way of an e-mail message sent to a host-provided e-mail address (step 184).

Figure 3:
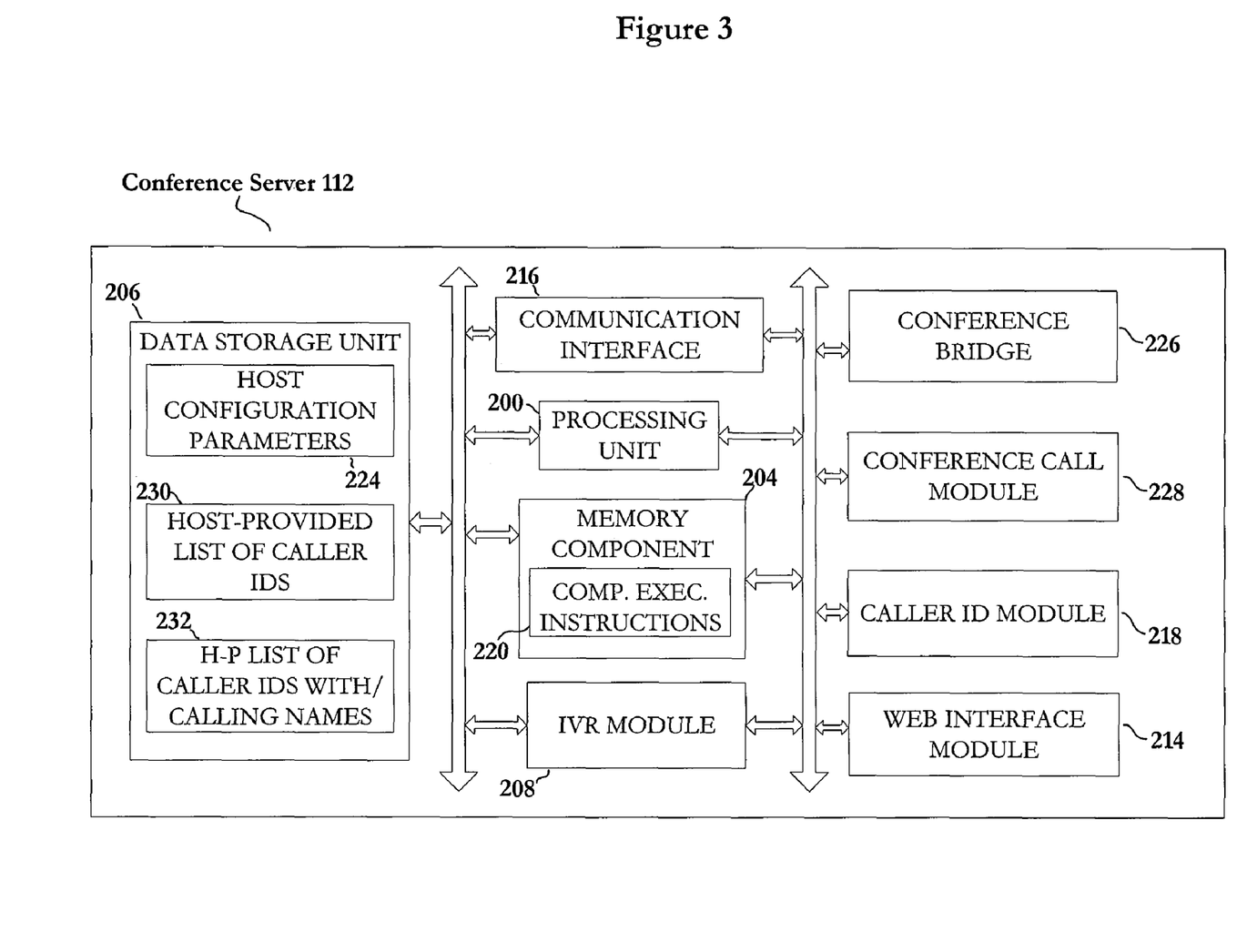
FIG. 3 depicts a conference server in accordance with an illustrative embodiment.

With reference now to FIG. 3, an embodiment of conference server 112 in accordance with the illustrative embodiments is presented. In the depicted embodiment, conference server 112 includes, among other things, a processing unit 200, a memory component 204, and a data storage unit 206. Processing unit 200 may comprise of one or more microprocessors for executing computer usable program code/instructions for providing caller identification for a TDM conference call. For example, in one embodiment, processing unit 200 executes computer executable instructions 220 stored in memory component 204 for retrieving a calling name associated with a caller ID of a participating caller on a TDM conference call.

In some embodiments, memory component 204 is a volatile memory component of conference server 112. Volatile memory is memory that loses its contents when conference server 112 loses power. For example, in some embodiments, memory component 204 may be random access memory (RAM). Random access memory stores currently executing instructions and/or data utilized by a software application and/or hardware device.

Data storage unit 206 is a non-volatile memory component of conference server 112, such as, but not limited to, a hard disk drive. Non-volatile memory retains stored data when power is loss. In some embodiments, data storage unit 206 may be an external hard drive and/or a network data storage unit. Additionally, in some embodiments, data storage unit 206 may store host configuration parameters 224 associated with providing caller identification for a TDM conference call. In addition, in some embodiments, data storage unit 206 may also store a host-provided list of expected caller IDs 230 in connection with a TDM conference call. For example, in one embodiment, the host-provided list of expected caller IDs 230 may be utilized to identify and alert a host of an unexpected caller ID. Further, in some embodiments, data storage unit 206 may store a host-provided list of expected caller IDs with corresponding calling names 232 for locally identifying the calling names associated with a caller ID.

In addition, conference server 112 may include a communication interface 216 for receiving signals and/or data from other network devices, such as, but not limited to, communication device 130, data processing system 128, web server 110, class 5 TDM telephone switch 116, and/or calling names database 126. For example, in some embodiments, communication interfaces 216 may include an Ethernet port and/or a telephone line port for connecting conference server 112 to class 5 TDM telephone switch 116 over communication network 110 for receiving caller ID information.

Additionally, in some embodiments, conference server 112 may include a conference bridge 226. In one embodiment, conference bridge 226 may be a printed circuit board (PCB) with electrical components for bridging or connecting multiple circuits in order to effectuate a TDM conference call. In other embodiments, conference bridge 226 may be software and/or a combination of hardware and software for handling a TDM conference call.

In some embodiments, conference server 112 may include a conference call module 228 for setting up and managing a TDM conference call, such as, but not limited to, handling the joining and leaving of participants. In some embodiments, conference call module 228 may also handle routing of the call audio from all participants to all other participants. In one embodiment, conference call module 228 may communicate with an interactive voice response (IVR) module 208 for receiving user input for reserving and/or configuring a TDM conference call. For instance, in one embodiment, interactive voice response (IVR) module 208 may answer a phone call from host 132 and present host 132 with a list of menus and/or features for configuring a TDM conference call. In other embodiments, conference call module 228 may communicate with a web interface module 214 to receive user input for reserving and/or configuring a TDM conference call. For example, in one embodiment, host 132 reserves and/or configure a TDM conference call with conference server 112 via a webpage hosted by web server 110. In these embodiments, web server 110 may pass the conference call data to web interface module 214 for enabling conference server 112 to configure the TDM conference call. Alternatively, in some embodiments, conference server 112 may locally host a webpage for enabling a user to reserve and/or configure a TDM conference call.

In addition, in one embodiment, conference server 112 may include a caller ID module 218 for receiving a caller ID associated with an incoming call to a TDM conference call from class 5 TDM telephone switch 116. In some embodiments, caller ID module 218 may also receive a calling name associated with a caller ID. In other embodiments, caller ID module 218 may communicate with a third-party calling names database for querying and retrieving a calling name associated with a caller ID. Alternatively, in some embodiments, caller ID module 218 may identify a calling name associated with an incoming caller ID using a host-provided caller IDs/calling names list. Further, in some embodiments, caller ID module 218 may be configured to identify an unexpected caller ID from a host-provided list of expected caller IDs associated with a TDM conference call.

Additionally, in some embodiments, host 132 may configure the means by which caller ID module 218 notifies host 132 of a caller ID, such as, but not limited to, presenting the caller ID on a webpage, sending the caller ID to host 132 via an e-mail or SMS message, and/or routing the caller ID to a communication device, such as, but not limited to, a conference telephone associated with host 132. For instance, in one embodiment, caller ID module 218 may utilize web interface module 214 for passing caller ID information from conference server 112 to web server 110 for displaying of the caller ID information on a webpage.

Figure 4:
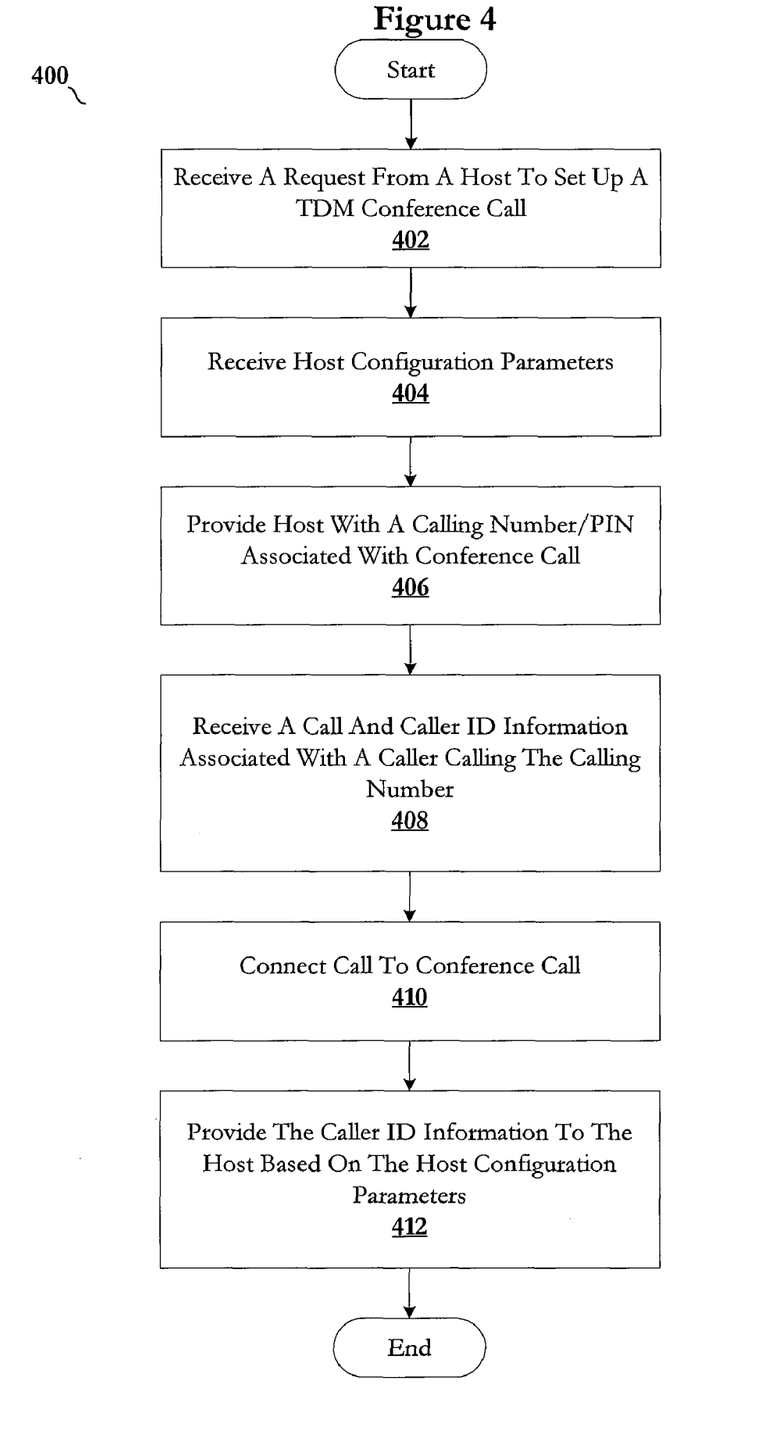
FIG. 4 depicts a flowchart illustrating an embodiment of a process for providing caller identification for a TDM conference call in accordance with the illustrative embodiments.

FIG. 4 depicts a flowchart illustrating an embodiment of a process 400 for providing caller identification for a TDM conference call in accordance with the disclosed embodiments. In one embodiment, process 400 may be performed by a conference server, such as, but not limited to, conference server 112 as depicted in FIG. 3. Process 400 begins by receiving a request from a host to set up a TDM conference call at step 402. For example, in one embodiment, the host provides a desired date and time for reserving conference server 112 for a TDM conference call. In addition, at step 404, the process may receive host configuration parameters associated with the TDM conference call, such as, but not limited to, whether to provide the caller IDs associated with participating callers of the conference call to the host. In one embodiment, the process, at step 406, may provide the host with a calling number for enabling a caller to call into conference server 112 and connect to the conference call. In some embodiments, the host may be provided with a unique access number for enabling conference server 112 to identify the host.

At step 408, the process receives a call and caller ID information corresponding to a caller calling the calling number. In some embodiments, the caller ID information may include a caller ID number and a calling name associated with the caller ID number. In other embodiments, the process may retrieve the calling name from a calling names database. The process, at step 410, connects the call to a TDM conference call associated with the calling number. At step 412, the process provides caller ID information to the host based on the host configuration parameters associated with the conference call, with process 400 terminating thereafter. For instance, in one embodiment, the process may transmit the caller ID information to a calling device associated with the host. In other embodiments, the process may update a webpage depicting the caller IDs of participants connected to a TDM conference call.

Figure 5:
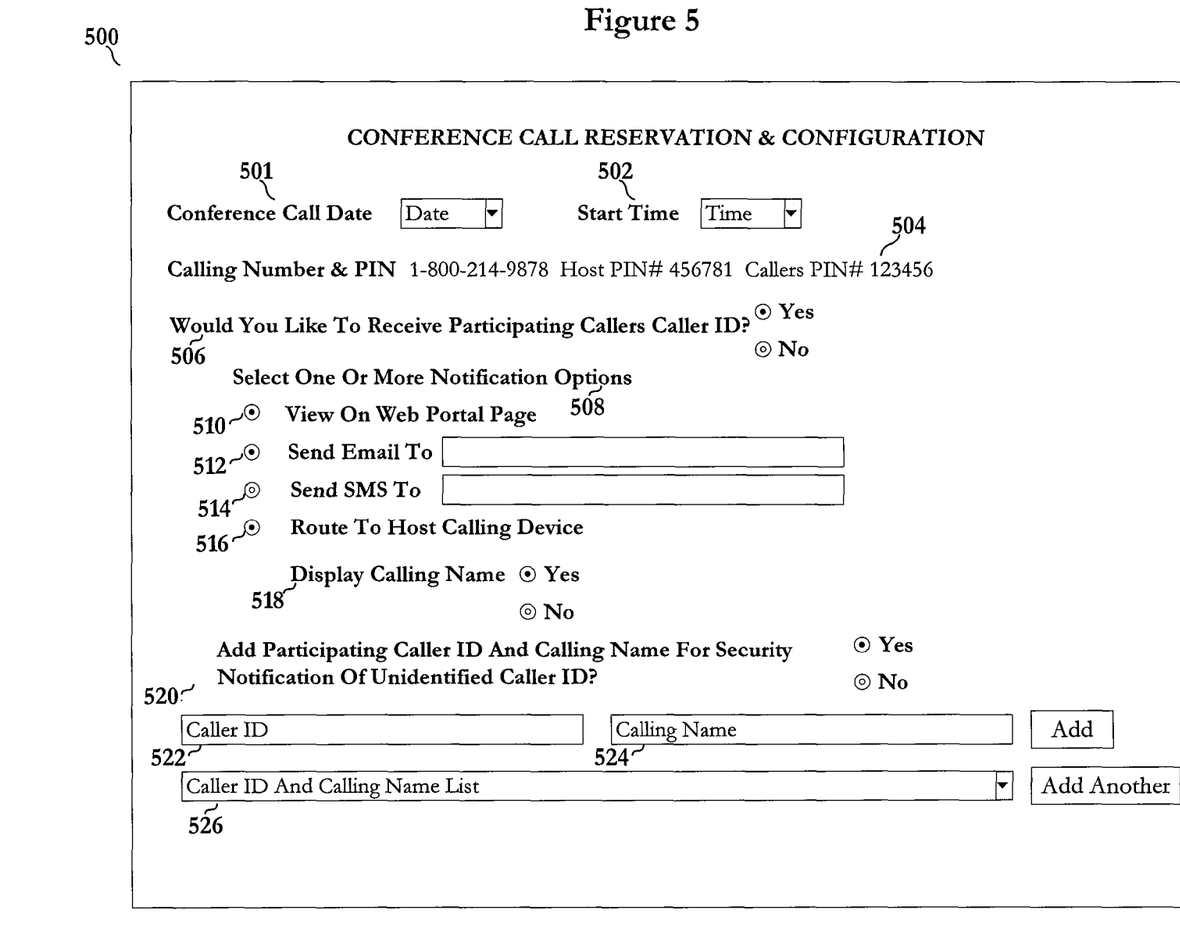
FIG. 5 depicts an embodiment a webpage user interface for configuring the host configuration parameters for a TDM conference call in accordance with the illustrative embodiments.

FIG. 5 depicts an embodiment a webpage user interface 500 for configuring host configuration parameters for a TDM conference call in accordance with the illustrative embodiments. In the depicted embodiment, user interface 500 includes a user configurable option for selecting a TDM conference call date (501) and start time (502). In addition, in one embodiment, user interface 500 may provide a host with a calling number and private identification number (PIN) associated with the reserved conference call (504).

In some embodiments, user interface 500 may include a user-selectable option for receiving participating caller IDs of callers calling into the reserved conference call (506). In addition, in some embodiments, user interface 500 may include a user configurable notification option 508, for selecting one or more means for providing the caller ID information associated with participating callers to the host. For example, in one embodiment, user interface 500 may include, but is not limited to, a view on webpage option 510, a send e-mail to a user specified address option 512, a send SMS messages to a user specified phone number option 514, and a route to host calling device option 516.

Additionally, in some embodiments, user interface 500 may include a user-selectable option (518) for displaying the calling name associated with a caller ID of a participating caller. In one embodiment, user interface 500 may include a user-selectable security option (520) for enabling the host to provide a list of expected caller IDs. For example, in one embodiment, conference server 112 may be configured to notify the host when an unexpected caller ID is encountered. In some embodiments, the host-provided list (526) may include a calling name (524) associated with a particular caller ID (522). Further, in some embodiments, conference server 112 may be configured to retrieve the calling name locally from the host-provided list of expected caller IDs and calling name.

In summary, the disclosed embodiments present a system and method for providing caller identification for a TDM conference call. As will be appreciated by one skilled in the art, certain aspects of the disclosed embodiments may be embodied as an apparatus, method, or computer program product. In addition, the disclosed embodiments including, but not limited to, the disclosed modules may be implemented entirely with hardware or as a software embodiment (including firmware, resident software, micro-code, etc.) or an embodiment combining software and hardware aspects. Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

I claim:

1. A method performed by a conference server for providing caller identification information for a TDM conference, the method comprising:
    receiving a request from a host to set up a conference call that utilizes a time division multiplex (TDM) telecommunication switching system;
    receiving host configuration parameters associated with providing the host with caller ID information of callers participating in the conference call;
    providing the host with a calling number for enabling callers participating in the conference call to call in;
    receiving a call and caller ID information associated with a caller calling the calling number;
    connecting the call to the conference call;
    providing the caller ID information to the host based on the host configuration parameters;
    receiving the caller ID information and a calling name associated with the caller ID information from a class 5 telephone switch, and
    providing the caller ID information and the calling name to the host based on the host configuration parameters.

2. The method of claim 1, wherein the host configuration parameters associated with providing the host with caller ID information of callers participating in the conference call include notifying the host with the caller ID information via SMS to a host-specified phone number.

3. The method of claim 1, wherein the host configuration parameters associated with providing the host with caller ID information of callers participating in the conference call include notifying the host with the caller ID information via an email to a host-specified email address.

4. The method of claim 1, wherein the host configuration parameters associated with providing the host with caller ID information of callers participating in the conference call include notifying the host with the caller ID information via a webpage.

5. The method of claim 1, wherein the host configuration parameters associated with providing the host with caller ID information of callers participating in the conference call include notifying the host with the caller ID information by routing the caller ID information to a host conference telephone device for displaying the caller ID on a display of the host conference telephone device.

6. A method performed by a conference server for providing caller identification information for a TDM conference, the method comprising:
    receiving a request from a host to set up a conference call that utilizes a time division multiplex (TDM) telecommunication switching system;
    receiving host configuration parameters associated with providing the host with caller ID information of callers participating in the conference call;
    providing the host with a calling number for enabling callers participating in the conference call to call in;
    receiving a call and caller ID information associated with a caller calling the calling number;
    connecting the call to the conference call;
    providing the caller ID information to the host based on the host configuration parameters;
    querying a calling name database to retrieve a calling name associated with the caller ID information; and
    providing the caller ID information and the calling name to the host based on the host configuration parameters.

7. A method performed by a conference server for providing caller identification information for a TDM conference, the method comprising:

receiving a request from a host to set up a conference call that utilizes a time division multiplex (TDM) telecommunication switching system;

receiving host configuration parameters associated with providing the host with caller ID information of callers participating in the conference call;

providing the host with a calling number for enabling callers participating in the conference call to call in;

receiving a call and caller ID information associated with a caller calling the calling number;

connecting the call to the conference call;

providing the caller ID information to the host based on the host configuration parameters;

querying a host-provided list to retrieve a calling name associated with the caller ID information; and providing the caller ID information and the calling name to the host based on the host configuration parameters.

8. A method performed by a conference server for providing caller identification information for a TDM conference, the method comprising:

receiving a request from a host to set up a conference call that utilizes a time division multiplex (TDM) telecommunication switching system;

receiving host configuration parameters associated with providing the host with caller ID information of callers participating in the conference call;

providing the host with a calling number for enabling callers participating in the conference call to call in;

receiving a call and caller ID information associated with a caller calling the calling number;

connecting the call to the conference call;

providing the caller ID information to the host based on the host configuration parameters;

determining whether the caller ID information is included in a host-provided list of expected caller IDs; and responsive to a determination that the caller ID information is not included on the host-provided list of expected caller IDs, notifying the host that the caller ID information is not on the host-provided list.

9. The method of claim 1, wherein the host configuration parameters are received via a webpage.

10. The method of claim 1, wherein the host configuration parameters are received using an interactive voice response (IVR) system.

11. A conference server for providing caller identification information for a TDM conference, the conference server comprising:

a memory component for storing computer executable instructions;

a processing unit for executing the computer executable instructions;

a TDM conference call module for setting up the TDM conference call and for receiving host configuration parameters for providing a host with caller ID information of callers participating in the TDM conference call;

a communication interface for receiving a caller ID associated with an incoming call to the TDM conference call;

a conference bridge for connecting the incoming call to the TDM conference call;

a caller ID module for providing the caller ID associated with the incoming call to the host based on the host configuration parameters; and a data storage unit for storing a host-provided list of caller IDs associated with expected participants of the TDM conference call, and wherein the caller ID module queries the host-provided list for determining whether the caller ID associated with the incoming call to the TDM conference call is on the host-provided list of caller IDs and notifies the host of an unexpected caller ID in response to the caller ID associated with the incoming call to the TDM conference call not being on the host-provided list.

12. The conference server of claim 11, further comprising an interactive voice response (IVR) module for receiving, via a telephone device, the host configuration parameters.

13. The conference server of claim 11, further comprising a web interface module for receiving the host configuration parameters from a web server.

14. The conference server of claim 11, further comprising a web interface module for receiving the host configuration parameters from a web server and for displaying the caller ID associated with the incoming call to the TDM conference call on a webpage.

15. The conference server of claim 11, further comprising a data storage unit for storing the host configuration parameters.

16. A conference server for providing caller identification information for a TDM conference, the conference server comprising:

a memory component for storing computer executable instructions;

a processing unit for executing the computer executable instructions;

a TDM conference call module for setting up the TDM conference call and for receiving host configuration parameters for providing a host with caller ID information of callers participating in the TDM conference call;

a communication interface for receiving a caller ID associated with an incoming call to the TDM conference call;

a conference bridge for connecting the incoming call to the TDM conference call;

a caller ID module for providing the caller ID associated with the incoming call to the host based on the host configuration parameters; and a data storage unit for storing a host-provided list of calling names associated with expected participants of the TDM conference call, and wherein the caller ID module queries the host-provided list for determining a calling name associated with the caller ID of the incoming call to the TDM conference call for providing the caller ID and the calling name to the host.

17. A conference server for providing caller identification information for a TDM conference, the conference server comprising:

a memory component for storing computer executable instructions;

a processing unit for executing the computer executable instructions;

a TDM conference call module for setting up the TDM conference call and for receiving host configuration parameters for providing a host with caller ID information of callers participating in the TDM conference call;

a communication interface for receiving a caller ID associated with an incoming call to the TDM conference call;

a conference bridge for connecting the incoming call to the TDM conference call;

a caller ID module for providing the caller ID associated with the incoming call to the host based on the host configuration parameters, the caller ID module configured to query a calling name database to retrieve a calling name associated with the caller ID of the incoming call to the TDM conference call and provide the caller ID and the calling name to the host.

18. A telecommunication system utilizing time division multiplex (TDM) technology for providing caller identification information for a TDM conference call, the telecommunication system comprising:
    a Class 5 telephone switch and a conference server; the Class 5 telephone switch comprising:
        a memory component for storing computer executable instructions for providing caller identification information for the TDM conference call;
        a data storage unit for storing configuration data for sending caller ID information to the conference server associated with the TDM conference call; and
        a processing unit for executing the computer executable instructions for routing a call and the caller ID information to the conference server;
    and wherein the conference server comprises:
        a TDM conference call module for setting up the TDM conference call and for receiving host configuration parameters for providing the host with caller ID information of callers participating in the TDM conference call;
        a communication interface for receiving, from the Class 5 telephone switch, a caller ID associated with an incoming call to the TDM conference call;
        a conference bridge for connecting the incoming call to the TDM conference call; and
        a caller ID module for providing the caller ID associated with the incoming call to the host based on the host configuration parameters.

\* \* \* \* \*